United States Patent Office 3,314,736
Patented Apr. 18, 1967

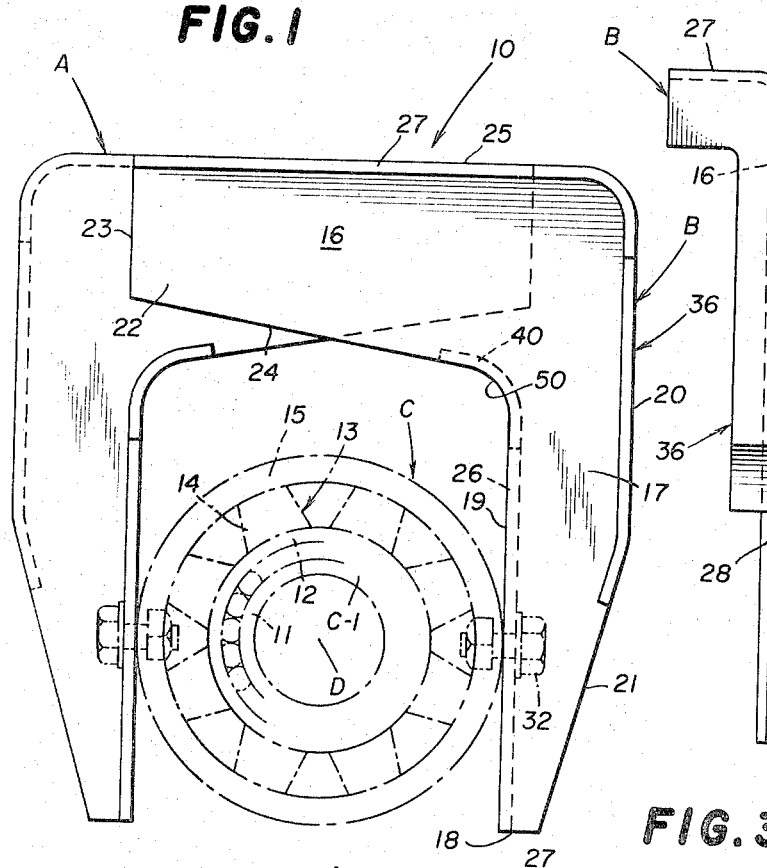
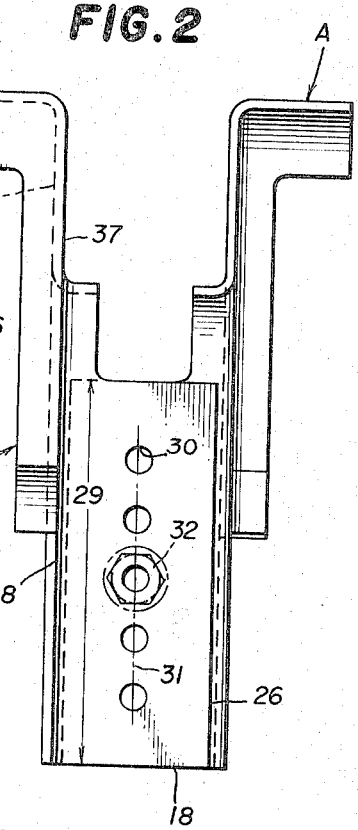
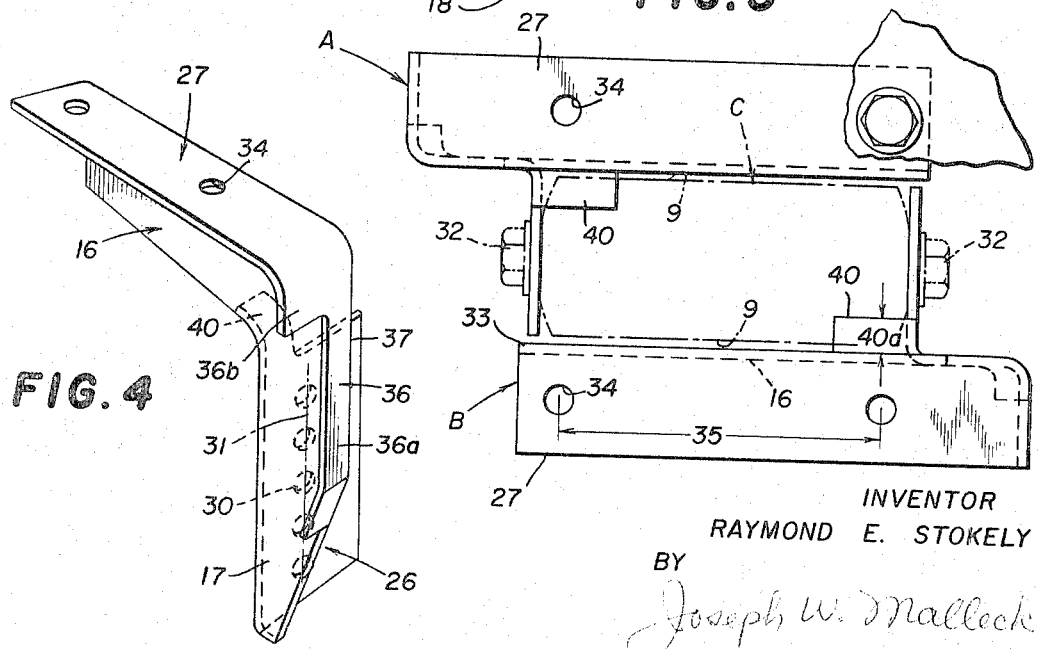

3,314,736
DRIVELINE BEARING SUPPORT
Raymond E. Stokely, Rockford, Ill., assignor to Borg-Warner Corporation, Chicago, Ill., a corporation of Illinois
Filed Nov. 30, 1964, Ser. No. 414,614
4 Claims. (Cl. 308—27)

This invention relates to an adjustable bracket assembly for mounting a rotative driveline bearing and more particularly to a heavy duty assembly comprised of members formed of sheet metal.

A primary object of this invention is to provide a rigid supporting assembly for a driveline bearing which is comprised of identical constituent parts which may be interchanged or adjustably arranged in a different manner to meet requirements of a specific bearing application.

Another object of this invention is to provide a component support bracket which is effective to resist radial as well as axial loads received from an annular bearing means supporting a vehicle driveline, said bracket being characterized by a unique combination of flanges arranged to afford maximum strength and durability while utilizing the economy of sheet metal material.

Other objects and advantages of this invention will become more apparent from the following detailed description taken in connection with the accompanying drawings in which:

FIGURE 1 is an elevational view of a bracket assembly embodying the principles of this invention and illustrating a driveline bearing supported by said assembly, said bearing being shown in phantom outline;

FIGURE 2 is a side elevational view of the embodiment shown in FIGURE 1;

FIGURE 3 is a plan view of the embodiment of FIGURE 1 and illustrating a portion of supporting structure to which the top of said bracket assembly is fastened; and FIGURE 4 is perspective view of one of the brackets comprising said assembly.

Turning now to the drawings and more particularly to FIGURE 1, the mounting assembly, generally designated 10, broadly comprises a pair of brackets A and B of identical configuration and arranged in opposed manner to support a circular bearing means C therebetween. The bearing means may be of the type as illustrated in applicant's copending application Serial No. 373,200, filed June 8, 1964, commonly assigned to the assignee of this invention. The bearing means is extending along a rotative axis D, said bearing means having an internal bearing C–1 provided with radially inner and outer races 11 and 12, the outer race 12 being resiliently supported for both axial and radial adjustment by a resilient ring 13 carrying a plurality of ears 14 nested within an outer bearing casing 15, the casing 15 being rigidly fastened to said brackets A and B respectively. The casing is generally circularly cylindrical and has terminal edges or portions 9 lying in parallel planes.

Each bracket of the assembly is broadly comprised of three, generally flat, flanges 16, 26 and 27 defined from a single body of sheet metal such as may be produced by stamping dies. Each bracket has a first flange or web 16 which is generally L-shaped in silhouette (as viewed in FIGURE 1), the flange 16 lying in a plane which is perpendicular to the axis D of rotation of said bearing and generally parallel but spaced from the terminal portions defining these sides of said bearing casing; one leg 17 of said first flange 16 has an elongated dependency which terminates with an end edge 18 coterminous with the bottom of said bearing. The edges 19 and 20 are generally parallel except for a biased edge 21 provided for specific space requirement reasons for the preferred embodiment. Another leg 22 of flange 16 extends above and across the upper portion of said bearing casing; leg 22 has a terminating edge 23 lying in a plane tangent to a side of said bearing casing, and one side edge 24 biased upwardly with another edge 25 disposed generally parallel to edge 18 of said leg 17. Both of said legs 17 and 22 have an elongated dimension greater than the diameter of said bearing casing.

Another flange 26 is provided lying in a plane perpendicular to the flange 16 and has an integrally common straight edge 28 with leg 17 of said first flange 16. Flange 26 is also disposed generally parallel to the axis D of said bearing and effective to fit tangentially against the cylindrical side wall of the bearing casing, as shown in FIGURE 1. Flange 26 is generally rectangular in configuration and has an elongated dimension 29 substantially equal to the diameter of said bearing casing. Flange 26 has one or more circular openings 30 provided along a line 31 generally parallel to said flange 16. The openings 31 permit vertical adjustment of fasteners 32 which may extend therethrough to rigidly connect the bracket and bearing casing.

Another flange 27 is disposed in a plane perpendicular to each of said flanges 16 and 26, said flange 27 having one straight edge 33 integrally common with the flange 16. Flange 27 is substantially rectangular in configuration and has a plurality of circular openings 34 provided therein to receive fasteners which may extend therethrough to connect the bracket with a rigid support member of the vehicle upon which said driveline is to be mounted, said openings 34 being spaced apart a distance 35 commensurate with the diameter of said bearing casing.

To rigidify said brackets A and B against axial loads transmitted by said bearing means from said driveline, a tongue 36 is formed from one end of said flange 27 and is bent downwardly into a plane parallel to said flange 26 and spaced outwardly therefrom a distance equal to the width of said leg 17 of flange 16. Said tongue 36 has a stepped configuration with both generally long and short stepped portions 36a and 36b each having an edge 37 which is integrally common with the outer edge 20 of said leg 17.

Each of the brackets A and B is provided with another tongue 40 effective to resist radial reaction loads from said bearing casing, said tongue extending along slightly curved inner crotch 50 formed between the legs of said flange 16, said tongue 40 having a width 40a extending axially outwardly therefrom.

Each of the brackets A and B are identical in configuration and are adapted to be arranged in the assembly so that the legs 22 of flanges 16 extend toward each other forming a rectangular spacing of openings 34 with flanges 26 on opposite sides of the bearing casing.

While I have described my invention in connection with one specific embodiment and other alternative suggestions thereof, it is understood that this is by way of illustration and not by way of limitation and the scope of my invention is defined solely by the appended claims which should be construed as broadly as the prior art will permit.

I claim:
1. A bearing assembly having a mounting bracket, a bearing and a rigid fixture, said bearing having a central axis and a cylindrical side wall concentrically arranged about said axis having an axial width defined by terminal portions lying in spaced planes perpendicular to said bearing axis, said bracket comprising a body of rigid material having at least three generally flat flanges, a first L-shaped flange disposed adjacent and parallel to one of said bearing terminal portions having each leg of said L-shaped flange greater in dimension than the greatest dimension of said bearing, a second flange disposed tangential to said bearing side wall and generally parallel to said axis, said second flange having one edge integrally common with an edge of one leg of said first flange, a third flange having one edge integrally common with an edge of another leg of said first flange and being disposed perpendicular to the plane of each of said first and second flanges, and means on said third flange effective to permit fastening thereof to said rigid fixture and means on said second flange effective to provide adjustable fastening thereof to said bearing side wall, said third flange carries a tongue extending in a plane spaced from and parallel to the plane of said second flange, said tongue having edges integral with both said first and third flanges.

2. A bracket as in claim 1, in which said second flange carries a tongue extending into a plane parallel to and spaced from said third flange, said tongue having side edges integral with edges of said first and second flanges.

3. A bearing assembly having a plurality of brackets, a bearing and a rigid fixture, said bearing having a central axis and having a circular cylindrical side wall generally concentric with said axis, the axial depth of said cylindrical side wall being defined by terminal portions of each lying in planes perpendicular to said axis, said brackets, each having a body of rigid material provided with at least three substantially flat flanges, a first L-shaped flange disposed in a plane perpendicular to said axis with each leg of said L each longer in dimension than the diameter of said bearing, said bearing being disposed between the included angle defined by said legs, a second flange lying in a plane perpendicular to the plane of said first flange and parallel to said axis and having one edge integrally common with an edge of one leg of said first flange, said second flange having one or more openings provided therein, said openings being aligned parallel to the plane of said first flange, a third flange having one edge integrally common with an edge of another leg of said first flange and disposed in a plane perpendicular to each of said first and second flanges, each of said second and third flanges extending in opposite directions from the said first flange, said brackets being adjustably attached to said bearing with said one leg of each bracket extending toward each other, said third flange carries a tongue extending in a plane spaced from and parallel to the plane of said second flange, said tongue having edges integral with both said first and third flanges.

4. A bracket as in claim 3, in which said second flange carries a tongue extending into a plane parallel to and spaced from said third flange, said tongue having side edges integral with edges of said first and second flanges.

References Cited by the Examiner
UNITED STATES PATENTS

| | | | |
|---|---|---|---|
| 921,704 | 5/1909 | Hubbard | 248—248 |
| 966,906 | 8/1910 | Grannis | 308—31 X |
| 1,147,774 | 7/1915 | Woodhead | 308—31 |
| 1,572,851 | 2/1926 | Spreen | 248—300 |
| 1,621,053 | 3/1927 | Besse | 308—33 X |
| 3,215,378 | 11/1965 | Kroll | 248—14 |

FOREIGN PATENTS

| | | |
|---|---|---|
| 24,642 | 11/1898 | Great Britain. |
| 23,648 | 12/1907 | Sweden. |

MARTIN P. SCHWADRON, *Primary Examiner.*

DAVID J. WILLIAMOWSKY, *Examiner.*

N. ABRAMS, R. HESS, *Assistant Examiners.*